US008298676B2

(12) United States Patent
Kato et al.

(10) Patent No.: US 8,298,676 B2
(45) Date of Patent: Oct. 30, 2012

(54) ELECTROCONDUCTIVE MATERIAL AND METHOD OF PRODUCING THE SAME

(75) Inventors: Takashi Kato, Kanagawa (JP); Naoyuki Hayashi, Kanagawa (JP); Naoya Imamura, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 546 days.

(21) Appl. No.: 12/553,126

(22) Filed: Sep. 3, 2009

(65) Prior Publication Data
US 2010/0075139 A1 Mar. 25, 2010

(30) Foreign Application Priority Data

Sep. 25, 2008 (JP) .................... 2008-246831

(51) Int. Cl.
*B32B 27/40* (2006.01)
*B05D 5/12* (2006.01)

(52) U.S. Cl. ............ 428/423.1; 428/425.8; 428/425.9

(58) Field of Classification Search .......... 428/336, 428/423.1, 457, 480, 688, 704, 425.8, 425.9; 427/58
See application file for complete search history.

(56) References Cited

U.S. PATENT DOCUMENTS 6,197,418 B1 * 3/2001 Cloots et al. ............... 428/332
8,057,904 B2 * 11/2011 Murakami et al. ......... 428/423.7

FOREIGN PATENT DOCUMENTS

| EP | 1013413 A1 * | 6/2000 |
| EP | 440957 A2 | 8/2007 |
| JP | 2007-510807 T2 | 4/2007 |

* cited by examiner

*Primary Examiner* — Thao T. Tran
(74) *Attorney, Agent, or Firm* — SOLARIS Intellectual Property Group, PLLC

(57) ABSTRACT

An electroconductive material has a support, at least one electroconductive layer on or above the support, and an adhesive layer containing at least two binder resins between the support and the electroconductive layer. Preferably, the electroconductive layer contains PEDOT and PSS, the support is composed of PET, and the adhesive layer contains a polyurethane resin and an acrylic resin.

16 Claims, 1 Drawing Sheet

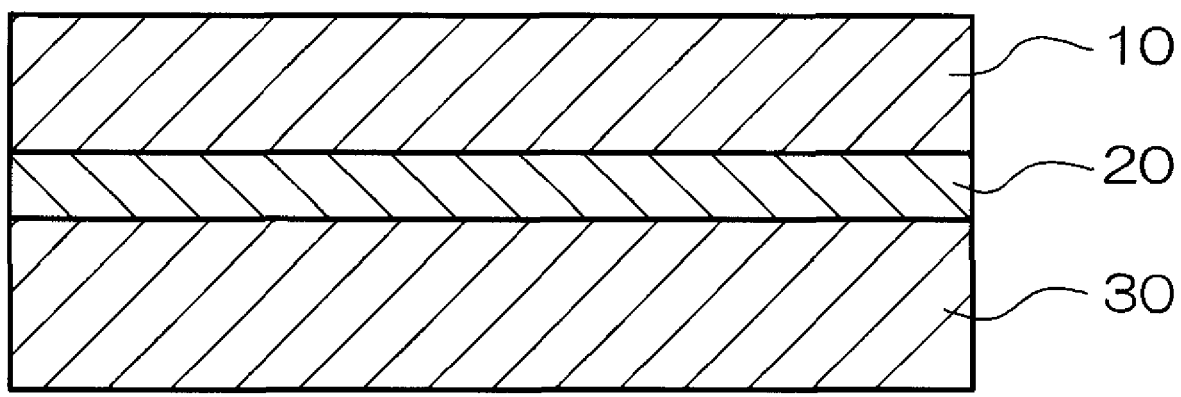

ELECTROCONDUCTIVE MATERIAL AND METHOD OF PRODUCING THE SAME

CROSS REFERENCE TO RELATED APPLICATIONS

This application claims priority under 35USC 119 from Japanese Patent Application No. 2008-246831, filed on Sep. 25, 2008, the disclosure of which is incorporated herein by reference.

BACKGROUND OF THE INVENTION

1. Field of the Invention

The present invention relates to an electroconductive material and a method of producing thereof.

2. Description of the Related Art

In recent years, an image display device (display) represented by a liquid crystal display (LCD), a plasma display panel (PDP), an electroluminescence (EL) element and the like have become used widely in various fields such as television sets, computers, various kinds of mobile devices and others that have recently become popular. On the other hand, a solar cell has been focused as an energy source replaceable for fossil energy, and a solar cell with high-performance or the like has been requested to be developed in order to meet further popularization thereof. In these display devices and solar cells, an electroconductive film is used.

Generally, electroconductive films using a metallic material, such as ITO-based electroconductive films, are produced by forming, on a glass substrate, a film from a metallic material by a vapor phase method such as a vacuum deposition method or a sputtering method. Display devices such as portable telephones and mobile instruments have been becoming lighter in weight, and it has been demanded that a display device substrate be shifted from glass to plastic. The introduction of a plastic substrate has reduced the weight of display devices to become half or less in comparison to the convectional products, and a plastic substrate has been remarkably improved in strength and impact resistance.

There, however, is a problem with regard to ITO-based electroconductive films in that the substitution of glass substrates with plastic films results in a decrease in adhesiveness, and making a substrate and a formed electroconductive film prone to easily peel apart from each other. Moreover, metallic materials, such as ITO, are ordinarily formed into a film by using a vapor phase method such as sputtering, so that an expensive production apparatus needs to be used.

As an electroconductive material replaceable for these, a coating type electroconductive material including a π-electron conjugated polymer that is an electroconductive polymer, a silver nano-wire, and a carbon material such as a carbon nano-tube or a grapheme is known. The use of an electroconductive polymer allows a conductive thin film to be formed by coating and offers the advantage that a conductive thin film may be inexpensively produced. Moreover, an electrode made of an electroconductive polymer is more flexible and less brittle than ITO electrodes, and it therefore is less prone to break even though it is used for flexible items. Accordingly, it is advantageous to apply an electrode made of an electroconductive polymer to touch panels that specifically require high flexibility, since lifetime may be extended in view of durability and reliability of apparatuses.

As such an electroconductive polymer, polythiophene containing polyanion has been developed, and a technique for forming an electroconductive film by using this polymer is disclosed in the specification of European Patent No. 440957.

It, however, has become clear that this electroconductive film is slightly weaker in durability than ITO films and the like and that it may not achieve a durability sufficient for practical use in some applications. In particular, when the electroconductive films are used for a display device, durability against light is important, that is, transparency or electrical conductivity is required not to be lowered even after the films are irradiated with light of a certain level or more. In addition to that, the electrical conductivity has been found to be also lowered by an action of humidity or heat.

Further, these electroconductive films are poor in adhesion in some cases and have been found not to have practically sufficient adhesion in a certain application. Therefore, an attempt of improving the adhesion by using the electroconductive films in combination with an adhesive layer is disclosed in Japanese Patent Application Laid-Open (JP-A) No. 2007-510807.

However, also in this case, practically sufficient adhesion and durability have been found not to be attained in a certain application.

SUMMARY OF THE INVENTION

A first aspect of the present invention provides an electroconductive material, having: a support; at least one electroconductive layer on or above the support; and an adhesive layer containing at least two binder resins between the support and the electroconductive layer.

A second aspect of the present invention provides a method of producing an electroconductive material according to claim 1, the method including: biaxially drawing process in which a support made of polyester; an adhesive layer forming process in which an aqueous coating liquid for forming an adhesive layer is coated by coating on at least one face of the support after the drawing, and dried; and drying; and an electroconductive layer forming process.

BRIEF DESCRIPTION OF THE DRAWING

FIG. 1 is a schematic cross-sectional view showing an example of the layered configuration of the electroconductive polymer material according to the present invention.

DETAILED DESCRIPTION OF THE INVENTION

Hereinafter, the present invention will be described in detail. The denotation "to" in this specification means the numerals before and after "to", both inclusive as the minimum value and the maximum value, respectively.

In the related arts so far disclosed, adhesion has been improved by combining the electroconductive layer with an adhesive layer. However, an electroconductive film is expected to have a still improved adhesion in practical applications. Durability is also expected to be improved.

In particular, in an application such as touch panels, a high adhesion is requested to be secured even at the time when pressing force is applied repeatedly by fingers or the like. Further, the electrical conductive material is sometimes placed outside of the room, so that durabilities against light, humidity and heat are expected to be improved.

Considering the above circumstances, the present inventors have made extensive studies and reached an unexpected finding that a specific configuration of an adhesive layer has a large influence on the durabilities of the conductive material. Base on this finding, with further studies, the present invention has been accomplished.

The electroconductive material of the present invention has at least one electroconductive layer on or above a support, and an adhesive layer which contains at least two binder resins between the support and the electroconductive layer.

By incorporating, between the support and the electroconductive layer, the adhesive layer that contains at least two binder resins, the electroconductive material exhibits more excellent adhesion and durabilities as compared with conventional electroconductive materials. Further, "durability" in the present invention refers to such a property that the change in the surface resistance is small after the material is exposed to light or experiences humidity or heat.

A specific example of a layered configuration of the electroconductive material is shown in FIG. 1.

The electroconductive material shown in FIG. 1 has an electroconductive layer 10 on a support 30, and between the support 30 and the electroconductive layer 10, an adhesive layer 20.

In FIG. 1, the electroconductive material having one electroconductive layer on a support is shown, but two or more electroconductive layers may be incorporated therein. Also, an electroconductive material having one adhesive layer 20 is shown, but two or more adhesive layers may be incorporated therein. Further, an UV-light absorbing layer or an electroconductive layer may be incorporated, also plural layers thereof may be incorporated. Still further, a protective layer or an intermediate layer may be incorporated, also plural layers thereof may be incorporated. From the viewpoint of improving durabilities, the UV-light absorbing layer or the protective layer (overcoat layer) may be preferably incorporated.

Hereinafter, the configuration of each component of the electroconductive material according to the present invention will be described.

<Electroconductive Layer>

The electroconductive material used in the present invention is a material that exhibits an electrical conductivity of $10^{-6}$ S·cm$^{-1}$ or higher. Any material that falls into this category may be usable, which includes a polymer material, a carbon material, a metallic material, and an inorganic compound material. For instance, a π-electron conjugated polymer, silver, and a carbon material may be included.

A polymer material, a carbon material, and a metallic material are preferable. A polymer material, carbon nanotubes, a graphene material, and a silver material are more preferable. A polymer material is still more preferable. A polymer material having an electrical conductivity of $10^{-1}$ S·cm$^{-1}$ or higher is furthermore preferable.

The electroconductive polymer is preferably a non-conjugated polymer or conjugated polymer made up of aromatic carbon rings or aromatic heterocycles linked by single bonds or divalent or multivalent linking groups.

The aromatic carbon rings in the non-conjugated polymer or conjugated polymer is, for example, a benzene ring and also may be formed a fused ring.

The aromatic heterocycle in the non-conjugated polymer or conjugated polymer is, for example, a pyridine ring, a pyrazine ring, a pyrimidine ring, a pyridazine ring, a triazine ring, an oxazole ring, a thiazole ring, an imidazole ring, an oxadiazole ring, a thiadiazole ring, a triazole ring, a tetrazole ring, a furan ring, a thiophene ring, a pyrrole ring, an indole ring, a carbazole ring, a benzimidazole ring, an imidazopyridine ring, or the like. It also may be formed a fused ring and may have a substituent.

Examples of the divalent or multivalent linking group in a non-conjugated polymer or conjugated polymer include linking groups formed by a carbon atom, a silicon atom, a nitrogen atom, a boron atom, an oxygen atom, a sulfur atom, metal, metal ion, or the like. Preferred are a carbon atom, a nitrogen atom, a silicon atom, a boron atom, an oxygen atom, a sulfur atom, and a group formed of a combination thereof. Examples of such a group formed of a combination include a methylene group, a carbonyl group, an imino group, a sulfonyl group, a sulfinyl group, an ester group, an amide group and a silyl group, which are either substituted or unsubstituted.

Specific examples of the electroconductive polymer include polyaniline, poly(para-phenylene), poly(para-phenylenevinylene), polythiophene, polyfuran, polypyrrole, polyselenophene, polyisothianaphthene, polyphenylene sulfide, polyacethylene, polypyridylvinylene and polyazine, which are electroconductive and are either substituted or non-substituted. These may be used either singly or, according to the purpose, in combination of two or more kinds thereof.

If a desired electrical conductivity is achieved, it may be used in the form of a mixture with another polymer having no electrical conductivity, and copolymers of such monomers with other monomers having no electrical conductivity may also be used.

The electroconductive polymer is preferably a conjugated polymer. Examples of such a conjugated polymer include polyacethylene, polydiacetylene, poly(para-phenylene), polyfluorene, polyazulene, poly(para-phenylene sulfide), polypyrrole, polythiophene, polyisothianaphthene, polyaniline, poly(para-phenylenevinylene), poly(2,5-thienylenevinylene), multiple chain type conjugated polymers (polyperinaphthalene, an the like), metal phthalocyanine-type polymers, and other conjugated polymers [poly(para-xylylene), poly[α-(5,5'-bithiophenediyl)benzylidene], and the like.

Preferred are poly(para-phenylene), polypyrrole, polythiophene, polyaniline, poly(para-phenylenevinylene) and poly(2,5-thienylenevinylene). More preferred are poly(para-phenylene), polythiophene and poly(para-phenylenevinylene). Still more preferred are polypyrrole, polythiophene, polyaniline or derivatives thereof, from the viewpoint of high electrical conductivity. Furthermore preferred is polythiophene, from the viewpoint of high durability and electrical conductivity.

Such conjugated polymers may have a substituent, examples of the substituent include substituents which are described as $R^{11}$ in Formula (I) given below.

In the present invention, it is preferable, from the viewpoint of compatibility of high transparency and high electrical conductivity, particularly that the electroconductive polymers have a partial structure represented by the following Formula (I) (in other words, that it be polythiophene or its derivative).

Further, the term of "transparency or transparent" used herein means that the transmittance of visible light with a wavelength of 550 nm is at least 50%. A transparent conductive polymer material has a transmittance of preferably at least 60% and more preferably at least 70%.

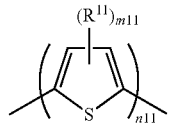

Formula (I)

In Formula (I), $R^{11}$ represents a substituent; and m11 is an integer of from 0 to 2. When m11 represents 2, the $R^{11}$s may be either the same or different and also may be linked each other to form a ring. $n^{11}$ is an integer of 1 or greater.

The substituent represented by $R^{11}$ includes alkyl groups (preferably having 1 to 20 carbon atoms, more preferably having 1 to 12 carbon atoms, and still more preferably having 1 to 8 carbon atoms; for example, methyl, ethyl, isopropyl, tert-butyl, n-octyl, n-decyl, n-hexadecyl, cyclopropyl, cyclopentyl and, cyclohexyl), alkenyl groups (preferably having 2 to 20 carbon atoms, more preferably having 2 to 12 carbon atoms, and still more preferably having 2 to 8 carbon atoms; for example, vinyl, allyl, 2-butenyl, 3-pentenyl, 2-hexenyl, 3-hexenyl, 4-hexenyl and 2-octenyl), alkynyl groups (preferably having 2 to 20 carbon atoms, more preferably having 2 to 12 carbon atoms, and still more preferably having 2 to 8 carbon atoms; for example, propargyl and 3-pentynyl), aryl groups (preferably having 6 to 30 carbon atoms, more preferably having 6 to 20 carbon atoms, and still more preferably having 6 to 12 carbon atoms; for example, phenyl, p-methylphenyl and naphthyl), amino group (preferably having 0 to 20 carbon atoms, more preferably having 0 to 10 carbon atoms, and still more preferably having 0 to 6 carbon atoms; for example, amino, methylamino, dimethylamino, diethylamino, dibenzylamino, and diphenylamino), alkoxy groups (preferably having 1 to 20 carbon atoms, more preferably having 1 to 12 carbon atoms, and still more preferably having 1 to 8 carbon atoms; for example, methoxy, ethoxy, butoxy, hexyloxy and octyloxy), aryloxy groups (preferably having 6 to 20 carbon atoms, more preferably having 6 to 16 carbon atoms, and still more preferably having 6 to 12 carbon atoms; for example, phenyloxy and 2-naphthyloxy), acyl groups (preferably having 1 to 20 carbon atoms, more preferably having 1 to 16 carbon atoms, and still more preferably having 1 to 12 carbon atoms; for example, acetyl, benzoyl, formyl and pivaloyl), alkoxycarbonyl groups (preferably having 2 to 20 carbon atoms, more preferably having 2 to 16 carbon atoms, and still more preferably having 2 to 12 carbon atoms; for example, methoxycarbonyl and ethoxycarbonyl), aryloxycarbonyl groups (preferably having 7 to 20 carbon atoms, more preferably having 7 to 16 carbon atoms, and still more preferably having 7 to 10 carbon atoms; for example, phenyloxycarbonyl), acyloxy group (preferably having 2 to 20 carbon atoms, more preferably having 2 to 16 carbon atoms, and still more preferably having 2 to 10 carbon atoms; for example, acetoxy and benzoyloxy), acylamino groups (preferably having 2 to 20 carbon atoms, more preferably having 2 to 16 carbon atoms, and still more preferably having 2 to 10 carbon atoms; for example, acetylamino and benzoylamino), alkoxycarbonylamino groups (preferably having 2 to 20 carbon atoms, more preferably having 2 to 16 carbon atoms, and still more preferably having 2 to 12 carbon atoms; for example, methoxycarbonylamino), aryloxycarbonylamino groups (preferably having 7 to 20 carbon atoms, more preferably having 7 to 16 carbon atoms, and still more preferably having 7 to 12 carbon atoms; for example, phenyloxycarbonylamino), sulfonylamino groups (preferably having 1 to 20 carbon atoms, more preferably having 1 to 16 carbon atoms, and still more preferably having 1 to 12 carbon atoms; for example, methanesulfonylamino and benzenesulfonylamino), a sulfamoyl group (preferably having 0 to 20 carbon atoms, more preferably having 0 to 16 carbon atoms, and still more preferably having 0 to 12 carbon atoms; for example, sulfamoyl, methylsulfamoyl, dimethylsulfamoyl and phenylsulfamoyl), carbamoyl groups (preferably having 1 to 20 carbon atoms, more preferably having 1 to 16 carbon atoms, and still more preferably having 1 to 12 carbon atoms; for example, carbamoyl, methylcarbamoyl, diethylcarbamoyl and phenylcarbamoyl), alkylthio groups (preferably having 1 to 20 carbon atoms, more preferably having 1 to 16 carbon atoms, and still more preferably having 1 to 12 carbon atoms; for example, methylthio and ethylthio), arylthio groups (preferably having 6 to 20 carbon atoms, more preferably having 6 to 16 carbon atoms, and still more preferably having 6 to 12 carbon atoms; for example, phenylthio), sulfonyl groups (preferably having 1 to 20 carbon atoms, more preferably having 1 to 16 carbon atoms, and still more preferably having 1 to 12 carbon atoms; for example, mesyl and tosyl), sulfinyl groups (preferably having 1 to 20 carbon atoms, more preferably having 1 to 16 carbon atoms, and still more preferably having 1 to 12 carbon atoms; for example, methanesulfinyl and benzenesulfinyl), ureido groups (preferably having 1 to 20 carbon atoms, more preferably having 1 to 16 carbon atoms, and still more preferably having 1 to 12 carbon atoms; for example, ureido, methylureido and phenylureido), phosphoamide groups (preferably having 1 to 20 carbon atoms, more preferably having 1 to 16 carbon atoms, and still more preferably having 1 to 12 carbon atoms; for example, diethyl phosphoamide and phenyl phosphoamide), a hydroxy group, a mercapto group, halogen atoms (for example, fluorine atom, chlorine atom, bromine atom and iodine atom), a cyano group, a sulfo group, a carboxyl group, a nitro group, a hydroxamic acid group, a sulfino group, a hydrazino group, an imino group, heterocyclic groups (preferably having 1 to 20 carbon atoms and more preferably having 1 to 12 carbon atoms; examples of hetero atoms include a nitrogen atom, an oxygen atom and a sulfur atom; specific examples include pyrrolidine, piperidine, piperazine, morpholine, thiophene, furan, pyrrole, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylydine, quinoxaline, quinazoline, cinnoline, pteridine, acridine, phenanthroline, phenazine, tetrazole, benzimidazole, benzoxazole, benzthiazole, benzotriazole and tetraazaindene), and silyl groups (preferably having 3 to 40 carbon atoms, more preferably having 3 to 30 carbon atoms, and still more preferably having 3 to 24 carbon atoms; for example, trimethylsilyl and triphenylsilyl).

The substituent represented by $R^{11}$ may be additionally substituted. When it has a plural substituents, they may be either the same or different and may, if possible, be linked together to form a ring. Examples of the ring to be formed include a cycloalkyl ring, a benzene ring, a thiophene ring, a dioxane ring and a dithiane ring.

The substituent represented by $R^{11}$ is preferably an alkyl group, an alkenyl group, an alkynyl group, an alkoxy group and an alkylthio group, and more preferably an alkyl group, an alkoxy group and an alkylthio group. In still more preferably, when m11 is 2, two $R^{11}$s are alkoxy groups or alkylthio groups forming a ring, and it is preferable to form a dioxane ring or a dithiane ring.

When m11 is 1 in Formula (I), $R^{11}$ is preferably an alkyl group, and more preferably an alkyl group having 2 to 8 carbon atoms.

When Formula (I) is poly(3-alkylthiophene) that $R^{11}$ is an alkyl group, the linkage mode between the adjacent thiophene rings includes a sterically regular mode in which all thiophene rings are linked by 2-5' and a sterically irregular mode which contains 2-2' linkages and 5-5' linkages. Among them, the sterically irregular mode is preferred.

In the present invention, it is particularly preferable, from the viewpoint of achieving both high transparency and high electrical conductivity, that the electroconductive polymer is 3,4-ethylenedioxy-polythiophene, which is specific example compound (6) shown below.

The polythiophene represented by Formula (I) and derivatives thereof may be prepared by known methods such as those disclosed in J. Mater. Chem., 15, 2077-2088 (2005) and Advanced Materials, 12(7), 481 (2000). For examples, Denatron P502 (manufactured by NAGASE CHEMICAL CO., LTD.), 3,4-ethylenedioxythiophene (BAYTRON (registered trademark) M V2), and 3,4-polyethylenedioxythiopene/polystyrenesulfonate (BAYTRON (registered trademark) P), BAYTRON (registered trademark) C), BAYTRON (registered trademark) F E, BAYTRON (registered trademark) M V2, BAYTRON (registered trademark) P, BAYTRON (registered trademark) P AG, BAYTRON (registered trademark) P HC V4, BAYTRON (registered trademark) P HS, BAYTRON (registered trademark) PH, BAYTRON (registered trademark) PH 500 and BAYTRON (registered trademark) PH 510 (all the BAYTRONs are manufactured by H.C. Starck GmbH) may be obtained as commercial products.

A polyaniline (manufactured by Aldrich Chemical Company, Inc.), a polyaniline (emeraldine (phonetic) base) (manufactured by Aldrich Chemical Company, Inc.), or the like are available as polyaniline or derivatives thereof.

A polypyrrole (manufactured by Aldrich Chemical Company, Inc.) or the like are available as polypyrrole or derivatives thereof.

Specific examples of an electroconductive polymer are shown below, but the present invention is not limited to them. Besides these, compounds disclosed in W098/01909 and so on are also provided as examples.

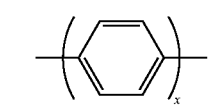
(1)

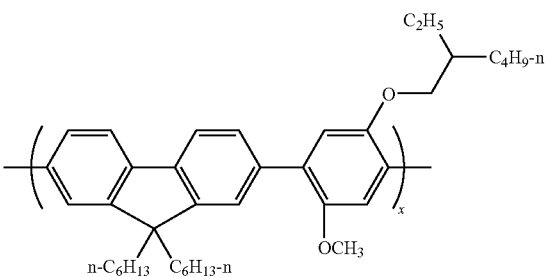
(2)

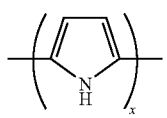
(3)

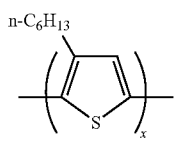
(4)

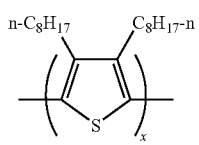
(5)

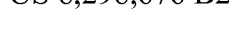
(6)

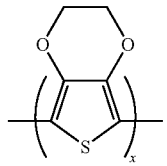
(7)

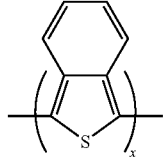
(8)

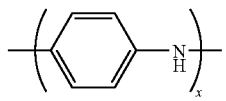
(9)

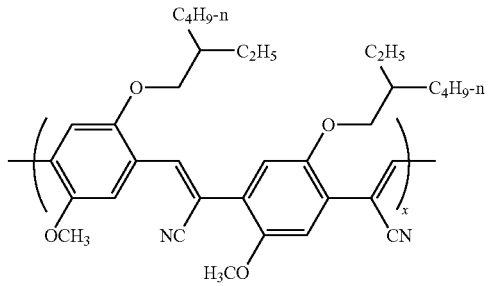
(10)

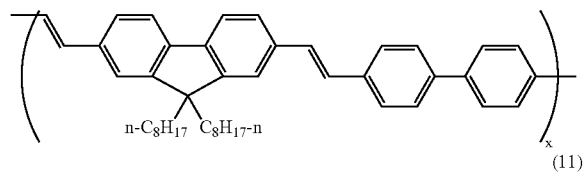
(11)

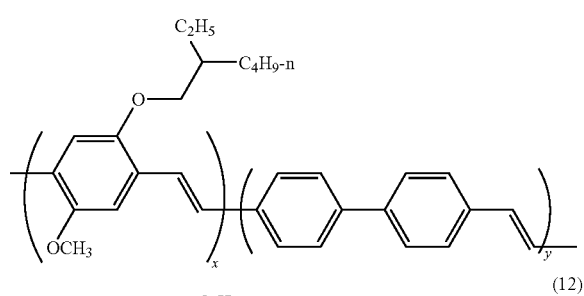
(12)

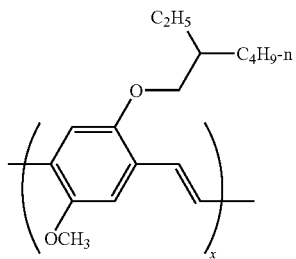
(13)

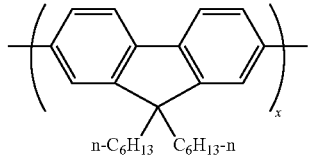

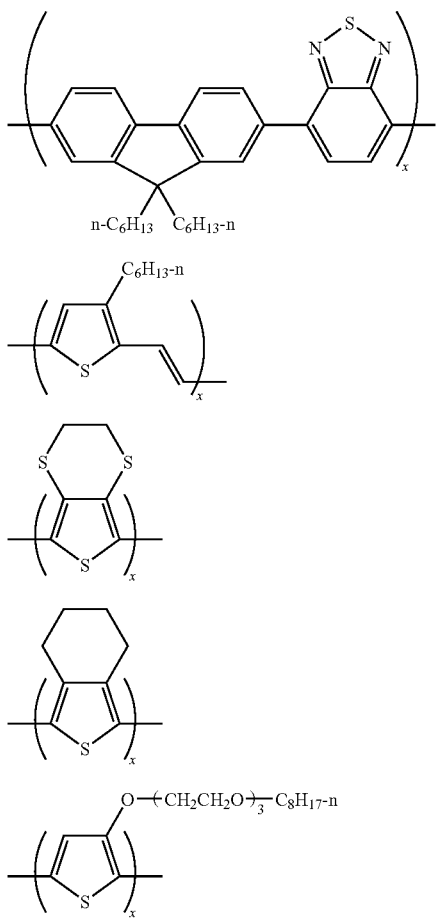

The weight average molecular weight of an electroconductive polymer to be used in the present invention is preferably from 1,000 to 1,000,000, more preferably from 10,000 to 500,000, and still more preferably from 10,000 to 100,000. The weight average molecular weight as used herein is a polystyrene-converted weight average molecular weight measured by gel permeation chromatography.

The thickness of the electroconductive layer 10 is preferably in the range of from 1 nm to 2 µm, and more preferably in the range of from 10 nm to 1 µm. Where the thickness of the electroconductive layer 10 is in this range, sufficient electroconductivity and transparency may be achieved.

It is desirable that the electroconductive layer 10 may contains at least one dopant considering that a dispersion liquid (composition) with an adequate dispersibility is attained and that the electrical conductivity of a film formed from the dispersion liquid is enhanced.

The electroconductive layer 10 is preferably formed by coating as described below, therefore, to obtain a dispersion liquid (composition) with favorable dispersibility is important from the viewpoint of production. The dopant as used herein means an additive which has an action of changing the electrical conductivity of an electroconductive polymer. Such dopants include electron-accepting (i.e., acceptor) dopants and electron-donating (i.e., donor) dopants.

Examples of electron-accepting (i.e., acceptor) dopants include halogens ($Cl_2$, $Br_2$, $I_2$, ICl, $ICl_3$, IBr, IF), Lewis acids ($PF_5$, $AsF_5$, $SbF_5$, $BF_3$, $BCl_3$, $BBr_3$, $SO_3$), protons acids (HF, HCl, $HNO_3$, $H_2SO_4$, $HClO_4$, $FSO_3H$, $ClSO_3H$, $CF_3SO_3H$, various organic acids, amino acids, and the like), transition metal compounds ($FeCl_3$, FeOCl, $TiCl_4$, $ZrCl_4$, $HfCl_4$, $NbF_5$, $NbCl_5$, $TaCl_5$, $MoF_5$, $MoCl_5$, $WF_6$, $WCl_6$, $UF_6$, $LnCl_3$ (Ln is lanthanide, such as La, Ce, Pr, Nd, and Sm), electrolyte anions ($Cl^-$, $Br^-$, $I^-$, $ClO_4^-$, $PF_6^-$, $AsF_6^-$, $SbF_6^-$, $BF_4^-$, various sulfonate anions), $O_2$, $XeOF_4$ ($NO_2^+$)($SbF_6^-$), ($NO_2^+$)($SbCl_6^-$), ($NO_2^+$)($BF_4^-$), $FSO_2OOSO_2F$, $AgClO_4$, $H_2IrCl_6$ and $La(NO_3)_3 \cdot 6H_2O$.

Examples of electron-donating (i.e., donor) dopants include alkali metals (Li, Na, K, Rb, Cs), alkaline earth metals (Ca, Sr, Ba), lanthanides (Eu, or the like), and others ($R_4N^+$, $R_4P^+$, $R_4As^+$, $R_3S^+$, acetylcholine).

Examples of the combination of the dopant and the electroconductive polymer include:
(A) polyacetylene with $I_2$, $AsF_5$, $FeCl_3$ or the like;
(B) poly(p-phenylene) with $AsF_5$, K, $AsF6^-$ or the like;
(C) polypyrrole with $ClO_4^-$ or the like;
(D) polythiophenes with $ClO_4^-$, or a sulfonic acid compound, especially polystyrene sulfonic acid, a nitrosonium salt, an aminium salt, a quinone, or the like;
(E) polyisothianaphthene with $I_2$ or the like;
(F) poly(p-phenylene sulfide) with $AsF_5$;
(G) poly(p-phenyleneoxide) with $AsF_5$;
(H) polyaniline with HCl or the like;
(I) poly(p-phenylenevinylene) with $H_2SO_4$ or the like;
(J) polythiophenylenevinylene with $I_2$ or the like;
(K) nickel phthalocyanine with $I_2$.

Among these combinations, preferred is the combination (D) or (H), more preferred, from the viewpoint that the dope condition is high in stability, is the combination of polythiophenes (polythiophene or its derivative) with a sulfonic acid compound, and still more preferred, from the viewpoint that the aqueous dispersion liquid may be prepared whereby an electroconductive thin film may be prepared easily by coating, is the combination of a polythiophenes with a polystyrene sulfonic acid.

The ratio of the electroconductive polymer to the dopant may be any value. From the viewpoint of well achieving both the stability of the dope condition and the electrical conductivity, the weight ratio of the electroconductive polymer to the dopant (electroconductive polymer: dopant) is preferably within the range of from 1.0:0.0000001 to 1.0:10, more preferably within the range of from 1.0:0.00001 to 1.0:1.0, and still more preferably within the range of 1.0:0.0001 to 1.0:0.5.

In order to improve the dispersibility of an electroconductive polymer, an ion-conductive polymer in which polymer chain has been doped with an electrolyte may be used. Examples of such a polymer chain include polyethers (polyethylene oxide, polypropylene oxide, and the like), polyesters (polyethylene succinate, poly-β-propiolactone, and the like), polyamines (polyethyleneimine, and the like), and polysulfides (polyalkylene sulfide, and the like). The electrolyte doped may be various alkali metal salts.

Examples of the alkali metal ion which constitutes the alkali metal salt include $Li^+$, $Na^+$, $K^+$, $Rb^+$ and $Cs^+$. Examples of the anion which forms the counter salt include $F^-$, $Cl^-$, $Br^-$, $I^-$, $NO_3^-$, $SCN^-$, $ClO_4^-$, $CF_3SO_3^-$, $BF_4^-$, $AsF_6^-$ and $BPh_4^-$.

Examples of the combination of the polymer chain and the alkali metal salt include polyethylene oxide with $LiCF_3SO_3$, $LiClO_4$ or the like; polyethylene succinate with $LiClO_4$, $LiBF_4$; poly-β-propiolactone with $LiClO_4$ or the like; polyethyleneimine with $NaCF_3SO_3$, $LiBF_4$ or the like; and polyalkylene sulfide with $AgNO_3$ or the like.

It is also possible to additionally add a solvent, described below, and other additives to the electroconductive layer 10 of the present invention. The available additives include inorganic fine particles and polymer particles for the purpose of increasing the film strength, silane coupling agents, and fluorine-containing compounds (especially, fluorine-containing surfactants) for the purpose of reducing a refractive index and increasing transparency simultaneously.

In addition, to the electroconductive material of the present invention, an additive may be added in order to increase durabilities. Examples of the additive may include a hydroxy compound, a phenol compound, an amine compound, a phosphoric acid compound, a phosphite compound, a sulfonic acid compound, a phosphorus compound, a hydroxyamine compound, and a hydroxamic acid compound.

The additive may be a low molecular compound or a polymer compound. Examples of the polymer compound may include polyvinylalcohol and polyester.

Any ratio of the above additive such as a hydroxy compound to the electroconductive polymer may be selected, and from the viewpoint of balancing between high electrical conductivity and high durabilities, the ratio of the additive to the electroconductive polymer (additive : electroconductive polymer) is within the range of from 0.00001:1.0 to 1000:1, preferably from 0.0001:1.0 to 100:1, and more preferably from 0.0005:1.0 to 10:1.

Any method of adding the additive may be selected. A preferable method may include a method of mixing a dispersion liquid containing the electroconductive polymer with a solution dissolving the additive, or a method of coating the electroconductive polymer and then further coating a solution dissolving the additive thereon.

A coating liquid for forming the electroconductive layer 10 (hereinafter, referred to as an "electroconductive polymer layer coating liquid") contains at least the electroconductive polymer and may be appropriately admixed with a solvent for coating or the dopant depending on the situation. Besides this, an additive may be further added. The additive further added may include a UV-light absorber, inorganic fine particles for the purpose of increasing film strength, polymer fine particles, a silane coupling agent, and a fluoro compound, in particular a fluoro surfactant, for the purpose of decreasing refractive index and increasing transparency.

Examples of the solvent used for the electroconductive polymer layer coating liquid may include water, alcohols, ethers, ketones, esters, hydrocarbons, halogenated hydrocarbons, amides and the like. Water and lower alcohols are preferable in view of cost, and water is preferable in consideration of environment.

Where water is used as a solvent, a known method may be applied as a method for dispersing the electroconductive polymer. Examples of the dispersion method may include dispersion methods such as jaw crusher method, ultracentrifugal pulverizing method, cutting mill method, automatic mortar method, disc mill method, ball mill method, ultrasonic dispersion method, and the like.

The concentration of the electroconductive polymer in the electroconductive polymer layer coating liquid is desirably adjusted properly consideration of viscosity and the like. Generally, the concentration is preferably from 0.01% by mass to from 50% by mass, and more preferably 0.1% by mass to 10% by mass.

The electroconductive polymer layer 10 is formed by coating the electroconductive polymer layer coating liquid. As the coating method, for example, a known coating methods such as an extrusion die coater, an air doctor coater, a bread coater, a rod coater, a knife coater, a squeeze coater, a reverse roll coater and a bar coater may be adopted.

In the case where the plural electroconductive polymer layers 10 are formed on or above the support 10, each layer may be applied and dried repeatedly, or plural layers may be formed by simultaneous multilayer coating. Simultaneous multilayer coating is preferable from the viewpoint of decreasing production costs and the shortening production time. Here, 'simultaneous multilayer coating' signifies that two coating solutions are applied in a contact condition.

The above-mentioned simultaneous multilayer coating may be performed by curtain coater, slide coater or extrusion coater, preferably curtain coater among them.

Further, in the case of a water-repellent support, an electroconductive layer with a uniform thickness is difficult to obtain because an electroconductive polymer layer coating liquid based on an aqueous solvent is repelled. However, when an adhesive layer is applied onto the support, the wettability to the electroconductive polymer coating liquid base on an aqueous solvent increases, and the electroconductive polymer coating liquid is prevented from being repelled, thereby providing an additional effect of attaining an electroconductive layer with an excellent coated face.

<Support>

Any material which is in the form of a stable panel and which satisfies required flexibility, strength, durability may be used as the support 30 capable of being used in the present invention. In the event that the resulting electroconductive polymer material is used in an image display device, a solar cell or the like, a high transparency is required and therefore the use of a transparent substrate with a smooth surface is preferred as a support.

For this reason, as the support of the present invention, a plastic film is preferable. The film is made of, for example, polyesters such as cellulose biacetate, cellulose triacetate, cellulose propionate, cellulose lactate, cellulose acetate lactate, cellulose nitrate, or polyethylene terephthalate; polyolefins such as polyethylene or polypropylene; or resins such as polystyrene, polycarbonate, polyvinylacetal, polyallylate, or cyclooefin polymer. The above polymers may be copolymers, appropriately.

In particular, as a material for the support 30, a polyester-based resin (hereinafter, referred to as "polyester" appropriately) is preferable. As the polyester, a linear saturated polyester that is synthesized from an aromatic dibasic acid or an ester formable derivative thereof and a diol or an ester formable derivative thereof is preferable.

Specific examples of the polyester used for the support 30 may include polyethylene terephthalate (PET), polyethylene isophthalate, polyethylene naphthalate (PEN), polybutylene terephthalate (PBT), poly(1,4-cyclohexylene dimethylene terephthalate), polyethylene-2,6-phthalene dicarboxylate, and cycloolefin polymers derived from norbornene. Among these, from the viewpoint of availability, cost and effect, polyethylene terephthalate, polyethylene naphthalate or the like is preferable, and polyethylene terephthalate is more preferable.

Moreover, a mixture of these copolymers or a mixture of these polymers with other resins in a small proportion may also be used as the material of a film, unless the effect of the present invention is impaired.

Furthermore, for the purpose of improving a smoothness, it is permissible to cause the polyester film to contain a small amount of inorganic or organic particles, for example, inorganic fillers, such as titanium oxide, calcium carbonate, silica and barium sulfate; organic fillers, such as acryls, silicone, benzoguanamine, Teflon (registered trademark) and epoxy resin. Adhesive improvers or antistatic agents, such as polyethylene glycol (PEG) and sodium dodecylbenzene sulfonate may be included into the polyester film.

The polyester film used in the present invention may be prepared by melt-extruding a polyester resin such as the one described above into a film form; then crystallizing the film through orientation-crystallization by longitudinal and lateral biaxial drawing and heat treatment. There is not any limitation on the draw ratio, but from 1.5 to 7 times is preferable and from 2 to 5 times is more preferable. In particular, a biaxially drawn film that is drawn in longitudinal and lateral directions by from 2 to 5 times respectively is preferable. When the draw ratio is in the above range, sufficient mechanical strength and uniform thickness may be obtained.

The thickness of the support is, from the viewpoint of the handling ability of the support and the miniaturization or weight saving of display devices, and further considering cost, preferably from 30 μm to 500 μm and more preferably from 100 μm to 300 μm.

The support 30 is preferably subjected to corona discharge treatment, ozone treatment or the like in order to have a higher adhesion to the adhesive layer 20.

<Adhesive Layer>

The adhesive layer is a layer that is laminated on or above the support 30. The adhesive layer 20 contains at least two binders and further contains preferably a compound having plural carbodiimide structures in the molecule thereof. The adhesive layer 20 may contain optionally fine particles, a sliding agent, and a surfactant.

Binder

The adhesive layer 20 has at least two reins as a binder. In the present invention, "at least two resins" means to contain plural resins which are constituted by different repeated units or different combination thereof respectively. Preferably, 2 to 5 resins are used in combination, and more preferably 2 to 4 resins are used in combination. From the view point of easiness of production and cost, preferably two resins are used in combination.

Examples of the resins usable for the adhesive layer 20 may include polyurethane resins, acrylic resins, rubber-based resins, polyester resins, polyamide resins, polyethylene resins, polypropylene resins, and polystyrene resins. Of these, at least two resins are used.

Preferably, at least a polyurethane resin and an acrylic resin are contained. A polyurethane resin and an acrylic resin have good compatibility with each other and provide a material having high adhesion and durabilities.

In addition, from the viewpoint of markedly preventing occurrence of increase in haze and uneven blushing, preferably a polyurethane resin having a glass transition temperature of 30° C. or higher and an acrylic resin having a glass transition temperature of 30° C. or higher are used in combination.

The glass transition temperature of the polyurethane resin is preferably 30° C. or higher, more preferably from 30° C. to 200° C., and still more preferably from 30° C. to 100° C.

The glass transition temperature of the acrylic resin is preferably 30° C. or higher, more preferably from 30° C. to 200° C., and still more preferably from 30° C. to 100° C.

The content of the polyurethane resin in the binder of the adhesive layer 20 is preferably from 10% to 99% by mass, more preferably from 15% to 98% by mass, and still more preferably from 20% to 95% by mass.

The polyurethane resin is the generic name of polymers that have an urethane bonding in the main chain thereof, and is usually obtained through the reaction between polyisocyanate and polyol. Examples of the polyisocyanate may include TDI, MDI, NDI, TODI, HDI, and IPDI. Examples of the polyol may include ethylene glycol, propylene glycol, glycerin, and hexane triol. Further, as the isocyanate of the present invention, a polymer that is obtained through the reaction between polyisocyanate and polyol and has a molecular weight increased by chain-extending treatment is also usable. The above described polyisocyanate, polyol, and chain-extending treatment are described in "Polyurethane Resin Handbook" (edited by Keiji Iwata, published by THE NIKKAN KOGYO SHINBUN, LTD., 1987), for example.

Among these polyurethane resins, the one that is prepared from an aliphatic diol compound and an aliphatic diisocyanate compound is preferably used.

The acrylic resin is a polymer that is composed of acrylic acid, methacrylic acid, or the derivatives thereof. A specific examples thereof may be included a polymer that is obtained by copolymerizing a main component including acrylic acid, methacrylic acid, methylmethacrylate, ethylacrylate, butylacrylate, 2-ethylhexylacrylate, acrylamide, acrylonitrile and hydroxylacrylate or the like with a monomer copolymerizable with the main component (styrene, divinylbenzene or the like, for example).

Among these acrylic resins, an acrylic resin that contains an alkyl group having 5 or less carbon atoms in the form of an ester group is preferably used.

As a resin that may be used in combination with the polyurethane resin and acrylic resin, a rubber-based resin may be included. The rubber-based resin is referred to a diene-based synthetic rubber among synthetic rubbers. Examples thereof may include polybutadiene, styrene-butadiene copolymer, styrene-butadiene-acrylonitrile copolymer, styrene-butadiene-divinylbenzene copolymer, butadiene-acrylonitrile copolymer, and polychloroprene.

The rubber-based resins are described in "Gosei Gomu Handbook" (edited by Shu Kambara et al., published by Asakura Publishing Co., Ltd., 1967), for example.

As a resin that is usable in combination with the polyurethane resin and acrylic resin, polyester resin may be included. Polyester is the generic name of polymers that have an ester bonding in the main chain thereof, and is usually obtained through the reaction between a polycarboxylic acid and a polyol. Examples of the polycarboxylic acid may include fumaric acid, itaconic acid, adipic acid, sebacic acid, terephthalic acid, and isophthalic acid. As the polyol, the one that has an alkylene group having from 2 to 10 carbon atoms may be preferably included. Examples thereof may include ethylene glycol, propylene glycol, trimethylene glycol, 1,3-butadine diol, 1,3-propane diol, 1,4-butane diol, 1,2-ethane diol, 1,5-pentane diol, 1,6-hexane diol, 1,7-heptane diol, 1,8-octane diol, 1,9-nonane diol, 1,10-decane diol, 1,4-cyclohexane dimethanol, trimethylolpropane, neopentyl glycol, and methylpentane diol.

Polyester resin and the source chemicals thereof are described in "Polyester Jushi Handbook" (edited by Eiichiro Takiyama, published by THE NIKKAN KOGYO SHINBUN, LTD., 1988).

As the binder, the above polymer that is dissolved in an organic solvent may be used, or an aqueous dispersion of the polymer may be used. Considering low environmental burden, an aqueous dispersion is preferably coated in an aqueous system. A commercially available polymer may be used as an aqueous dispersion.

Examples of a polyurethane resin aqueous dispersion may include "SUPER FLEX 830, 460, 870, 420, and 420NS" (trade names: polyurethane, manufactured by Dai-Ichi Kyogyo Seiyaku Co., Ltd.); "BONDIC 1370NS and 1320NS" (trade names: polyurethane, manufactured by Dainippon Ink & Chemicals, Inc.); and "OLESTER UD-350" and "TAKENATE WD220" (trade names: polyurethane, manufactured by Mitsui Chemicals Inc.

Examples of an acrylic resin aqueous dispersion may include "JURYMER ET325, ET410, and SEK301" (trade names: acryl, manufactured by Nihon Junyaku Co., Ltd.); "VONCOAT AN117 and AN226" (trade names: acryl, manufactured by Dainippon Ink & Chemicals, Inc.); and "EM48D" (trade name: acryl, manufactured by Daicel Chemical Industries, Ltd.).

Examples of a rubber-based resin aqueous dispersion may include "LACSTAR DS616 and DS807" (trade names: styrene-butadiene rubber, manufactured by Dainippon Ink & Chemicals, Inc.); "NIPOL LX110, LX206, LX426, and LX433" (trade names: styrene-butadiene rubber, manufactured by ZEON Corp.); and "NIPOL LX513, LX1551, LX550, LX1571" (trade names: acrylonitrile-butadiene rubber, manufactured by ZEON Corp.).

Examples of a polyester aqueous dispersion may include "FINETEX ES650 and ES2200" (trade names: polyester, manufactured by Dainippon Ink & Chemicals, Inc.); and "VYLONAL MD1400 and MD1480" (trade names: polyester, manufactured by Toyobo Co., Ltd.).

The mass ratio of the polyurethane resin to the acrylic resin in the adhesive layer 20 (polyurethane resin:acrylic resin) is preferably from 95:5 to 50:50 and more preferably from 95:5 to 70:30. By selecting the mass ratio within this range, an adequate coated surface is obtained.

In the binder resin of the adhesive layer 20, the total amount of the polyurethane resin and the acrylic resin is preferably from 10% to 100% by mass, more preferably from 15% to 100% by mass, and still more preferably from 20% to 100% by mass.

There is not any particular limitation on the molecular weight of the polymer used for the binder, but from the viewpoint of the film strength and the condition of the coated surface, a polymer having a weight average molecular weight of from about 3,000 to about 1,000,000 is preferably used.

Crosslinking Agent

The adhesive layer 20 may preferably contain a crosslinking agent, from the viewpoint of enhancing film strength.

Examples of the crosslinking agent used in the adhesive layer 20 may include a carbodiimide compound, an oxazoline compound, an epoxy compound, and an isocyanate compound. Considering film strength, a carbodiimide compound or an oxazoline compound is preferable, a carbodiimide compound is more preferable, and a compound having plural carbodiimide structures in the molecule thereof (hereinafter, referred to as "polycarbodiimide" in some cases) is still more preferable.

Polycarbodiimide is generally synthesized through condensation of an organic diisocyanate. The organic groups of the organic diisocyanate used for this synthesis is not particularly limited, and any of aromatic and aliphatic ones or a mixture thereof is usable. From the viewpoint of reactivity, aliphatic ones are particularly preferable. As the sources for the synthesis, an organic isocyanate, an organic diisocyanate, an organic triisocyanate or the like may be used.

Examples of the organic isocyanate may include an aromatic isocyanate, an aliphatic isocyanate, and a mixture thereof.

Specific examples thereof may include 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, and 1,3-phenylene diisocyanate. Examples of an organic monoisocyanate may include isophorone isocyanate, phenyl isocyanate, cyclohexyl isocyanate, butyl isocyanate, and naphthyl isocyanate.

The carbodiimide compound usable in the present invention may be available as a commercial product such as "CARBODILITE V-02-L2" (trade name: manufactured by Nisshinbo Chemical Inc.).

The carbodiimide compound of the present invention is preferably added in the range of from 1% to 200% by mass with respect to the binder and more preferably from 5% to 100% by mass. When the addition amount of the carbodiimide compound is selected in the above range, the adhesive layer attains an excellent surface condition, and in the case where the adhesive layer 20 contains fine particles, the fine particles are prevented from dropping off.

Surfactant

The adhesive layer 20 may preferably contain a surfactant.

Examples of the surfactant usable in the adhesive layer 20 may include known anionic, nonionic, and cationic surfactants. The surfactant is described in "Handbook of Surfactants" (edited by Ichiro Nishi, Tooziro Imai, and Masai Kasai, published by Sangyo Tosho Co., Ltd., 1960), for example.

In particular, anionic and nonionic surfactants are preferable, and anionic surfactants are more preferable. By adding the anionic surfactants, an effect of stabilizing the doped state of the electroconductive material in the electroconductive layer 10 may be expected, thereby expecting improvements in the adhesion between the adhesive layer 20 and the electroconductive layer 10 and in the durabilities of the electroconductive material.

Further, the effect of stabilizing the doped state of the electroconductive material in the electroconductive layer 10, which is brought about by the anionic surfactants added to the adhesive layer 20, is an unexpected effect to those skilled in the art, because the anionic surfactant and the electroconductive material are contained separately in different layers.

Examples of the anionic group of the anionic surfactants may include sulfonic acid group, phosphoric acid group, and carboxylic acid group, and sulfonic acid group is preferable because the effect of stabilizing the doped state of the electroconductive material is larger. Examples of the anionic surfactants may include higher fatty acid salts such as soap, secondary higher fatty acid salts, higher alcohol sulfuric acid ester salts, secondary higher alcohol sulfuric acid ester salts, primary higher alkylsulfonic acid salts, secondary higher alkylsulfonic acid, higher alkyl disulfonic acid salts, sulfonated higher fatty acid salts, sulfated fat or fatty acid salts, higher alkylphosphoric acid ester salts, sulfuric acid ester salts of higher fatty acid esters, sulfonic acid salts of higher fatty acid esters, sulfonic acid salts of higher alcohols and ethers, alkylated sulfonic acid salts or sulfosuccinic acid ester salts of higher fatty acid salt amides, alkylbenzene sulfonic acid salts, alkylphenol sulfonic acid salts, alkylnaphthaline sulfonic acid salts, naphthenic acid salts, resin acid salts, and resin acid alcohol sulfuric acid ester salts. Of these, higher fatty acids and sulfonic acid salts are preferable. Among them, alkali metal salts (soap) such as sodium or potassium salts of higher fatty acids having from 12 to 18 carbon atoms or natural fat and oil fatty acids are more preferable.

Examples of the fatty acids of these soaps may include lauric acide, tridecyl acid, myristic acid, pentadecyl acid, palmitic acid, margaric acid, stearic acid, oleic acid, linoleic acid, and linolenic acid. Examples of the natural fat and oil that provides natural fat and oil fatty acids may include cacao oil, palm nut oil, peanut oil, soybean oil, cotton seed oil, linseed oil, sunflower oil, beef fat, lard, coconut oil, and olive oil. These oils and fats provide mainly fatty acids having from 12 to 18 carbon atoms.

Examples of the commercially available anionic surfactants may include "LAPISOL A-90", "LAPISOL A-80", "LAPISOL BW-30", and "LAPISOL C-70" (trade names: manufactured by Nippon Oil&Fat Co., Ltd.); "NIKKOL OTP-100" (trade name: manufactured by Nikko Chemicals Co., Ltd.); "KOHACOOL ON", "KOHACOOL L-40", and "PHOSPHANOL 702" (trade names: available from TOHO Chemical Industry Co., Ltd.); and "BEAULIGHT A-5000" and "BEAULIGHT SSS" (trade names: available from Sanyo Chemical Industries, Ltd.).

Examples of the commercially available nonionic surfactants may include "NAROACTY CL-95" (trade name: available from Sanyo Chemical Industries, Ltd.); "RISOREX BW400" (trade name: available from Kokyu Alcohol Kyogyo Co., Ltd.); "EMALEX ET-2020" (trade name: available from Nihon-Emulsion Co., Ltd.); and "UNILUBE 50MB-26" and "NONION IS-4" (trade names: available from NOF Corp.).

The coating amount of the surfactant is preferably in the range of from 0.1 $mg/m^2$ to 30 $mg/m^2$ and more preferably from 0.2 $mg/m^2$ to 10 $mg/m^2$. When the coating amount of the surfactant is in the above range, repelling is prevented from being developed and surface condition is improved.

The surfactant is preferably added in the range of from 0.0001% to 50% by mass with respect to the binder, and more preferably from 0.001% to 10% by mass.

When the percent of the addition of the surfactant is in the above range, repelling is prevented from being developed and surface condition is improved.

Additional Additives

In the adhesive layer 20, besides the above, various kinds of additives such as fine particles may be used in accordance with applications.

To the adhesive layer 20, from the viewpoint of improving sliding property and considering film strength, fine particles are preferably added. Any of organic and inorganic fine particles may be used as the fine particles.

For example, polymer fine particles of polystyrene, polymethylmethacrylate, silicone resin, benzoguanamine resin or the like and inorganic fine particles of silica, calcium carbonate, magnesium oxide, magnesium carbonate or the like may be used.

Among these, polystyrene, polymethylmethacrylate, and silica are preferable from the viewpoint of improving sliding property and considering cost.

Examples of the inorganic fine particles may include "SNOWTEX XL", "R503", and "SNOWTEX ZL" (trade names: manufactured by Nissan Chemical Co., Ltd.); and "AEROSIL OX-50" and "AEROSIL OX-90" (trade names: manufactured by Nippon Aerosil Co., Ltd.).

The average particle diameter of the fine particles is preferably from 0.3 μm to 12 μm and more preferably from 0.5 μm to 9 μm. When the average particle diameter of the fine particles are in the above range, the effect of improving sliding property is sufficiently exerted and resulting display devices are provided with an excellent display performance.

The coating amount of the fine particles may depends on the average particle diameter thereof, and may be preferably from 0.1 $mg/m^2$ to 30 $mg/m^2$ and more preferably from 0.5 $mg/m^2$ to 20 $mg/m^2$. Within the above range, an effect of improving sliding property is sufficiently exerted, and transparency is prevented from being lowered, thereby providing resulting display devices with an excellent display performance.

Further, the average particle size of the fine particles used in the present invention is an average value of particle diameters that are evaluated for arbitrary 50 fine particles in terms of a diameter of a circle having an area identical with the area of each fine particle observed with a scanning electron microscope.

The adhesive layer 20 may contains preferably a sliding agent as an additive, from the viewpoint of improving scratching resistance.

There is not any particular limitation on the kind of the sliding agent, but examples of the sliding agent preferably used may include synthetic or natural wax, a silicone compound, and a compound represented by R—O—SO$_3$M (R is a substituted or non-substituted alkyl group ($C_nH_{2n+1}$; n is an integer of from 3 to 20), M is a monovalent metal atom).

Specific examples of the sliding agent may include waxes such as "CELLOSOL 524, 428, 732-B, 920, and B-495", "HYDRIN P-7, D-757, Z-7-30, E-366, F-115, D-336, and D-337", "POLYRON A, 393, and H-481", and "HYMICRON G-110-F, 930, and G-270" (trade names: manufactured by Chukyo Yushi Co., Ltd.) or "CHEMIPEARL W100, W200, W300, W400, W500, and W950" (trade names: Mitsui Chemicals, Inc.); silicones such as "KF-412, 413, 414, 393, 859, 8002, 6001, 6002, 857, 410, 910, and 851", "X-22-162A", "X-22-161A", "X-22-162C", "X-22-160AS", "X-22-164B", "X-22-164C", "X-22-170B", "X-22-800", "X-22-819", "X-22-820", or "X-22-821" (trade names: manufactured by Shin-Etsu Chemical Co., Ltd.); and compounds represented by the formulas of $C_{16}H_{33}$—O—SO$_3$Na and $C_{18}H_{37}$—O—SO$_3$Na.

The coating amount of these sliding agents is preferably from 0.1 $mg/m^2$ to 50 $mg/m^2$ and more preferably from 1 $mg/m^2$ to 20 $mg/m^2$. When the coating amount of the sliding agent is within the above range, the adhesive layer 20 is allowed to exert sufficiently the sliding property thereof and is also prevented from being degraded in the surface condition thereof.

The adhesive layer 20 may contain an antistatic agent. Examples of the antistatic agent may include tin oxide, tin oxide doped with antimony, titanium oxide, zirconium oxide and zinc oxide. Tin oxide doped with antimony is preferable.

Properties and Others

The thickness of the adhesive layer 20 is from 30 nm to 200 nm and preferably from 40 nm to 100 nm. When the thickness is selected within this range, a surface condition having an adequate interference pattern may be obtained. Further, within this thickness range, the adhesion to the support 30 may be sufficiently secured and the adhesive layer 20 may be prevented from being degraded in the surface condition thereof.

The coating amount of the adhesive layer 20 is preferably in the range of from 0.01 $mg/m^2$ to 100,000 $mg/m^2$, and more preferably from 0.1 $mg/m^2$ to 10,000 $mg/m^2$. When the coating amount of the adhesive layer 20 is selected within this range, unevenness in coating may be prevented and the adhesion to the electroconductive layer 10 may be kept.

The I/O value of the binder in the adhesive layer 20 is preferably from 1 to 20, more preferably from 1.5 to 15, and still more preferably from 2 to 10.

Further, as the I/O value in the present invention, an I/O (Inorganic/Organic) value is used, which is calculated based on the table of inorganic groups described in "Yuki Gainen Zu, Kiso to Ouyo (Organic Conceptual Diagram: Basics and Application)" by Yoshio Kouda, published by SANKYO PUBLISHING Co., Ltd. When two or more binders are used in combination, a weighted average I/O value is calculated in accordance with the mass ratio of each binder.

The I/O value of the binder may be adjusted by selecting the substitution groups (by selecting the length of alkyl chains and the kind of functional groups).

The I/O values of the binders for the support 30, the adhesive layer 20, and the electroconductive layer 10 are preferably in the following relation.

Support 30≦Adhesive layer 20≦Electroconductive layer 10

The absolute value of the difference between the I/O value of binder in the adhesive layer 20 and the I/O value of binder in the support 30 is preferably from 0 to 4, more preferably from 0 to 3, and still more preferably from 0 to 2.

The absolute value of the difference between the I/O value of binder in the adhesive layer 20 and the I/O value of binder in the electroconductive layer 10 is preferably from 0 to 4, more preferably from 0 to 3, and still more preferably from 0 to 2.

The solubility parameter (SP value) of binder in the adhesive layer 20 is preferably in the range of from 7 to 20 $(cal/cm^3)^{1/2}$, more preferably from 8 to 18 $(cal/cm^3)^{1/2}$, and still more preferably from 8.5 to 15 $(cal/cm^3)^{1/2}$.

The solubility parameter (SP value) is calculated in accordance with the method described in "Polymer Handbook Fourth Edition" (published by John Wiley&Sons), VII680 to 683. The solubility parameter (SP value) is the one-half power of a cohesion energy density, that is, an evaporation energy per unit volume of molecule, and represents the magnitude of polarity per unit volume. In the case of polymers, the SP value is calculated by using the following Small's equation.

$$SP = d \Sigma G / M$$

M: unit molecular weight of polymer,
d: density, and
G: intrinsic constant for a group of atoms.

The solubility parameters of major polymers are described in the same "Polymer Handbook Forth Edition", VII702 to 711. In the present invention, as the solubility parameter, the value that is obtained by substituting the Hoy's cohesion energy constant into the above Small's equation is used. In the case of using two or more binders in combination, a weighted average SP value is calculated in accordance with the mass ratio of each binder.

The SP value of the binder may be adjusted by selecting the substitution groups (by selecting the length of alkyl chains and the kind of functional groups).

The SP values of the binder for the support 30, the adhesive layer 20, and the electroconductive layer 10 are preferably in the following relation.

Support 30≦Adhesive layer 20≦Electroconductive layer 10

The absolute value of the difference between the SP value of binder in the adhesive layer 20 and the SP value of binder in the support 30 is preferably from 0 to 4, more preferably from 0 to 3, and still more preferably from 0 to 2.

The absolute value of the difference between the SP value of binder in the adhesive layer 20 and the SP value of binder in the electroconductive layer 10 is preferably from 0 to 4, more preferably from 0 to 3, and still more preferably from 0 to 2.

Adhesive Layer

In FIG. 1, as the adhesive layer, one adhesive layer 20 is provided, but additional adhesive layers may be provided.

The total thickness of the adhesive layer is, considering high adhesion and cost, preferably from 30 nm to 200 nm and more preferably from 50 nm to 100 nm.

There is not any particular limitation on the method of forming the adhesive layer 20, but the layer is formed preferably by coating. Known coating processes including a bar coater coating and a slide coater coating may be used for the coating.

Further, drying is performed after coating. Upon drying, the maximum temperature is selected to be from 120° C. to 170° C. and preferably from 130° C. to 150° C. When the maximum temperature is selected within this range, oligomers are prevented from being formed under or inside of the adhesive layer 20, thereby providing an adequate adhesion to the support 30.

Upon coating, a solvent (coating solvent) may be used. As the coating solvent, water, toluene, methylalcohol, isopropylalcohol, methylethyketone, or an aqueous or organic solvent mixture of these solvents may be used. Among these, a process of using water as the coating solvent is preferable considering cost and easiness in production.

Coating may be performed after uniaxial or biaxial drawing, and it is preferable that coating process may be performed after biaxial drawing process in order to allow the deckle edges to be recovered after lateral drawing. Further, the adhesive layer 20 may be formed preferably not only on the one face of the support 30 but also on the other face thereof.

<Incorporation of Diol Compound>

The electroconductive material of the present invention preferably contains a diol compound from the viewpoint of lowering the resistivity thereof. The diol compound has at least two hydroxy groups in the molecule thereof and may include ethylene glycol, glycerin, propylene glycol, diethylene glycol, triethylene glycol, sugar (fructose or the like), hydroquinone, gallic acid, and catechol. Ethylene glyhcol is preferable.

The diol compound may be incorporated in the electroconductive layer 10 or may be applied onto the electroconductive layer 10 after it is formed. When the diol compound has a low molecular weight, it may not form a layer as a result of vaporization.

The incorporation amount of the diol compound is preferably from 0.01% to 95% by mass, more preferably from 0.1% to 90% by mass, and still more preferably from 1% to 90% by mass, with respect to the mass of the electroconductive layer 10.

Any incorporation ratio of the electroconductive polymer to the diol compound may be selected, but the mass ratio of the conductive polymer to the diol compound (conductive polymer:diol compound) is preferably in the range of from 1:1000 to 1000:1, more preferably from 1:100 to 100:1, and still more preferably from 1:10 to 10:1, from the viewpoint of satisfying the requirements for both of cost and electroconductivity.

<Overcoat Layer>

The electroconductive material of the present invention may has an overcoat layer in order to increase film strength and durabilities. As the binder that forms the overcoat layer, an epoxy resin and an isocyanate resin are preferable, and a multi-functional curable epoxy resin is particularly preferable. Further, additional binders may be incorporated. Examples of the curable epoxy resin may include "DENACOAL EX614B", "DENACOAL EX211", "DENACOAL EX411", "DENACOAL EX421", and "DENACOAL EX512" (trade names: manufactured by Nagase Chemtex Corp.).

In the overcoat layer, the foregoing surfactant, fine particles, and antistatic agent may be preferably incorporated.

The average thickness of the overcoat layer is preferably from 0.01 nm to 10,000 nm, more preferably from 0.1 nm to 1,000 nm, and still more preferably from 1 nm to 100 nm.

<Applications>

The electroconductive polymer material of the present invention is capable of forming an electroconductive film having an excellent durability against light and an excellent electrical conductivity. The electroconductive film may be suitably used as a wiring and an electrode (including a substrate electrode) for electronic materials. In particular, because the electroconductive film may be formed by coating, an electrode material with a large area is easily prepared and is suitable in substrate electrode applications.

The electroconductive film may be suitably used for flexible electroluminescence devices (OLED), touch screens, touch panels, organic TFTs, actuators, sensors, electronic paper, flexible photo-modulating material, solar cells, and the like.

EXAMPLES

The present invention is hereinafter described more specifically by referring to examples. Materials, reagents, amount of substances and ratio, and operations thereof described in the following examples may be properly modified unless deviating from the spirit of the present invention. Accordingly, the scope of the present invention is not limited to the following examples.

Example 1
Preparation of Support

A support for a laminated sheet was prepared in accordance with the following procedure.

Polyethylene terephthalate resin (hereinafter, referred to as PET), which had been prepared through polycondensation using Ge as a catalyst and has an intrinsic viscosity of 0.66, was dried so that the water content thereof becomes 50 ppm or lower, and then melted in an extruder by selecting the heater temperature thereof to be from 280° C. to 300° C. The melt of the PET resin was ejected through a die onto a chilled roll charged electrostatically so as to obtain an amorphous base. The resulting amorphous base was drawn by 3.3 times in the running direction of the base and further drawn by 3.8 times in the width direction so as to obtain a support having 188 μm thickness.

Preparation of Adhesive Layer

While the above support having 188 μm thickness was transported at a speed of 80 m/minute, the both faces thereof were subjected to corona discharging at 730 J/m$^2$, and then a coating liquid for forming an adhesive layer, having the following composition was coated on the both faces in a coating amount of 4.4 cm$^3$/m$^2$ by bar coating method. Adhesive layers were formed by drying at 160° C. for 1 minute. In this way, a laminated sheet having the adhesive layers coated on the both faces of the support was obtained.

The cross-section of the laminated sheet was observed with a transmission electron microscope ("JEM2010" (trade name: manufactured by JEOL Ltd.)) at a magnification of 200,000 times. The thickness of the adhesive layer was measured to be 70 nm.

Composition of Coating Liquid for Forming Adhesive Layer

Urethane resin binder: 30.7 parts by mass,
 Coating amount: 55 mg/m$^2$
  "OLESTER UD350" (trade name), manufactured by Mitsui Chemicals, Inc., solid content: 38% by mass
  SP value: 10, I/O value: 5.5, glass transition temperature: 33° C.
Acrylic resin binder: 4.2 parts by mass,
 Coating amount: 4.5 mg/m$^2$
  "AS563" (trade name), manufactured by DAICELL FINECHEM LTD., solid content: 27.5% by mass
  SP value: 9.5, I/O value: 2.5, glass transition temperature: 47° C.
Crosslinking agent: 5.8 parts by mass,
 Coating amount: 8 mg/m$^2$
  "CARBODILITE V-02-L2" (trade name), manufactured by Nisshinbo Chemical Inc., solid content: 40% by mass
Additive (fine particles (filler)): 1.9 parts by mass,
 Coating amount: 1 mg/m$^2$
  "AEROSIL OX-50" (trade name), manufactured by Nippon Aerosil Co., Ltd., solid content: 10% by mass
Additive (fine particles (filler)): 0.8 part by mass,
 Coating amount: 2 mg/m$^2$)
  "SNOWTEX XL" (trade name), manufactured by Nissan Chemical Co., Ltd., solid content: 40% by mass
Additive (sliding agent): 1.9 parts by mass,
 Coating amount: 3 mg/m$^2$
  "CELLOSOL 524" (trade name), manufactured by Chukyo Yushi Co., Ltd., solid content: 30% by mass
Surfactant 1: 15.5 parts by mass,
 Coating amount: 0.1 mg/m$^2$
  1% by mass aqueous solution of "LAPISOL A-90" (trade name), manufactured by Nippon Oil&Fat Co., Ltd., anionic
Surfactant 2: 19.4 parts by mass, and
 Coating amount: 0.1 mg/m$^2$
  1% by mass aqueous solution of "NAROACTY CL-95" (trade name), manufactured by Sanyo Chemical Industries, Ltd., nonionic
Distilled water: added in a manner that the total of the composition becomes 1,000 parts by mass.

Preparation of Electroconductive Layer

An aqueous dispersion liquid ("DENATRON P502" (trade name), manufactured by Nagase Chemtex Corp.) containing poly(3,4-ethylenedioxy)thiophene (PEDOT) doped with polystyrene sulfonic acid (PSS) was coated with a No. 9 bar coater onto the face of the PET film having the adhesive layer thereon, and dried to obtain a sample-1.

The thickness of the resulting electroconductive layer was 200 nm. The sample-1 was evaluated in accordance with the following methods.

<Measurement of Transmittance>

The transmittance of light at 550 nm was measured using an UV/vis spectrometer (trade name: Shimadzu U2400). The measurement was performed at four portinos of the sample-1 immediately after preparation, and the average value thereof was used as a measured value.

The result is shown in Table 2.

<Measurement of Surface Resistance Value>

The surface resistance value was measured using a surface resistance measuring apparatus (trade name: LOWRESTER GP, manufactured by Mitsubishi Chemical Corporation) at 25 C.° and 30% RH. Four portions in the samples immediately after preparation were measured specification, and the average value thereof was used as a measured value. The result is shown in Table 2.

<Evaluation of Film Quality>

Film quality was evaluated with a pencil hardness tester (manufactured by Yasuda Seiki Seisakusho LTD.).

<Measurement of Haze>

Haze of the sample-1 immediately after being produced was measured by using a haze measuring apparatus (trade name: MODELL1001DP, manufactured by Nippon Denshoku Industries Co., Ltd.). The results are shown in Table 2.

<Evaluation of Durability Against Light>

The sample-1 was irradiated over 160 hours by a xenon lamp light source (150,000 Lux) in a manner that the light was irradiated. After light irradiation, transmittance, surface resistance, haze, and film quality were measured by the methods described above. The results are shown in Table 2. Degradations in haze and film quality were not observed.

<Evaluation of Durability Against Humidity and Heat>

In order to evaluate the durability against humidity and heat of the sample, transmittance and surface resistance were measured by the methods described above after the sample was placed at a humidity of 95% RH and a temperature of 80° C. over 100 hours. The results are shown in Table 2.

<Evaluation of Adhesion>

With a single edged knife, six scars were formed vertically and horizontally on the surface of the coating layer to form 25 cells. A cellophane tape (No. 405, manufactured by NICHIBAN CO., LTD., 24 mm width) was applied onto the cells, and rubbed with a rubber eraser so as to be fully adhered. Then, the tape was peeled off in a direction perpendicular to the surface. The number of cells peeled off was counted so as to evaluate the adhesion between the upper layer and the adhesive layer. The width between the scars was 3 mm in both vertical and horizontal directions.

Rank A: peeling off is not observed in any cell,
Rank B: the number of cells peeled off is less than 1,
Rank C: the number of cells peeled off is 1 or more and less than 3,
Rank D: the number of cells peeled off is 3 or more and less than 20, and
Rank E: the number of cells peeled off is 20 or more.

The results are shown in Table 2.

Example 2

Substantially similarly to Example 1, a sample-2 was obtained, except that ethylene glycol was added to the aqueous dispersion liquid ("DENATRON P502" (trade name), manufactured by Nagase Chemtex Corp.) containing poly(3,4-ethylenedioxy)thiophene (PEDOT) doped with polystyrene sulfonic acid (PSS) to prepare a solution, and the solution was coated with a No. 9 bar coater onto the face of the PET film having the adhesive layer thereon, and dried. In the solution, ethylene glycol was added in the same amount of PEDOT·PSS.

The thickness of the resulting electroconductive layer was 100 nm. The sample-2 was evaluated by the methods described above. The evaluation results are shown in Table 2.

Examples 3 to 7

Substantially similarly to Example 2, samples-3 to 7 were obtained, except that a solution prepared by adding each compound represented by the following formulas in an amount of 2.0% by mass to the ethylene glycol aqueous solution containing PEDOT·PSS was coated with a No. 9 bar coater onto the face of the PET film having the adhesive layer thereon, and dried.

The thickness of the resulting electroconductive layers was 100 nm. The samples-3 to 7 were evaluated by the methods described above. The evaluation results are shown in Table 2.

Example 3

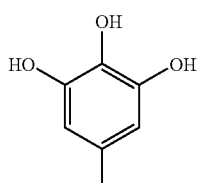

Hydroxy compound

Example 4

Phosphorous Acid Ester Compound $P(OC_5H_{11})_3$

Example 5

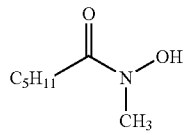

Hydroxamic acid compound

Example 6

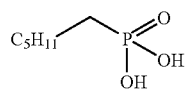

Phosphoric acid compound

Example 7

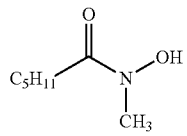 + 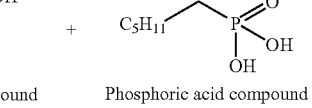

Hydroxamic acid compound          Phosphoric acid compound

Example 8

Substantially similarly to Example 1, a sample-8 was prepared, except that a glass substrate was replaced a PET substrate with a glass substrate. The resulting sample-8 was evaluated substantially similarly to Example 1. The results are shown in Table 2.

Example 9

Substantially similarly to Example 2, a sample-9 was prepared, except that a glass substrate was replaced a PET substrate with a glass substrate. The resulting sample-9 was evaluated substantially similarly to Example 1. The results are shown in Table 2.

Comparative Example 1

Substantially similarly to Example 1, a comparative sample-1 was prepared by coating an aqueous dispersion liquid ("DENATRON P502" (trade name), manufactured by Nagase Chemtex Corp.) containing poly(3,4-ethylenedioxy) thiophene (PEDOT) doped with polystyrene sulfonic acid (PSS) onto a PET substrate that has no adhesive layer and was prepared similarly to Example 1.

Comparative Example 2

Substantially similarly to Example 1, a comparative sample-2 was prepared, except that the coating liquid for forming an adhesive layer used in Example 1 was replaced by the following coating liquid for forming an adhesive layer. The evaluation results are shown in Table 2. The comparative sample-2 corresponds to a sample in which only one urethane resin was used for the binder of the adhesive layer.

Composition of Coating Liquid for Forming Adhesive layer
Urethane resin binder: 34.9 parts by mass,
  Coating amount: 60 mg/m$^2$
  "OLESTER UD350" (trade name), manufactured by Mitsui Chemicals, Inc., solid content: 38% by mass
  SP value: 10, I/O value: 5.5, glass transition temperature: 33° C.
Crosslinking agent: 5.8 parts by mass,
  Coating amount: 8 mg/m$^2$
  "CARBODILITE V-02-L2" (trade name), manufactured by Nisshinbo Chemical Inc., solid content: 40% by mass
Additive (filler): 1.9 parts by mass,
  Coating amount: 1 mg/m$^2$
  "AEROSIL OX-50" (trade name), manufactured by Nippon Aerosil Co., Ltd., solid content: 10% by mass,
Additive (filler): 0.8 part by mass,
  Coating amount: 1 mg/m$^2$
  "SNOWTEX XL" (trade name), manufactured by Nissan Chemical Co., Ltd., solid content: 40% by mass
Additive (sliding agent): 1.9 parts by mass,
  Coating amount: 2 mg/m$^2$
  "CELLOSOL 524" (trade name), manufactured by Chukyo Yushi Co., Ltd., solid content: 30% by mass
Surfactant 1: 15.5 parts by mass,
  Coating amount: 1 mg/m$^2$
  "LAPISOL A-90" (trade name), manufactured by Nippon Oil&Fat Co., Ltd., anionic, 1% by mass
Surfactant 2: 19.4 parts by mass, and
  Coating amount: 1 mg/m$^2$
  "NAROACTY CL-95" (trade name), manufactured by Sanyo Chemical Industries Ltd., nonionic, 1% by mass
Distilled water: added in a manner that the total of the composition becomes 1,000 parts by mass.

Comparative Example 3

Substantially similarly to Example 1, a comparative sample-3 was prepared, except that the coating liquid for forming an adhesive layer used in Example 1 was replaced by the following coating liquid for forming an adhesive layer. The evaluation results are shown in Table 2. The comparative sample-3 corresponds to a sample in which only one acrylic resin was used for the binder of the adhesive layer.

Composition of Coating Liquid for Forming Adhesive layer
Acrylic resin binder: 34.9 parts by mass,
  Coating amount: 42 mg/m$^2$
  "AS563" (trade name), manufactured by DAICELL FINECHEM LTD., solid content: 27.5% by mass
  SP value: 9.5, I/O value: 2.5, glass transition temperature: 47° C.
Crosslinking agent: 5.8 parts by mass,
  Coating amount: 8 mg/m$^2$
  "CARBODILITE V-02-L2" (trade name), manufactured by Nisshinbo Chemical Inc., solid content: 40% by mass
Additive (filler): 1.9 parts by mass,
  Coating amount: 1 mg/m$^2$
  "AEROSIL OX-50" (trade name), manufactured by Nippon Aerosil Co., Ltd., solid content: 10% by mass,
Additive (filler): 0.8 part by mass,
  Coating amount: 1 mg/m$^2$
  "SNOWTEX XL" (trade name), manufactured by Nissan Chemical Co., Ltd., solid content: 40% by mass
Additive (sliding agent): 1.9 parts by mass,
  Coating amount: 2 mg/m$^2$
  "CELLOSOL 524" (trade name), manufactured by Chukyo Yushi Co., Ltd., solid content: 30% by mass
Surfactant 1: 15.5 parts by mass,
  Coating amount: 1 mg/m$^2$
  "LAPISOL A-90" (trade name), manufactured by Nippon Oil&Fat Co., Ltd., anionic, 1% by mass
Surfactant 2: 19.4 parts by mass, and
  Coating amount: 1 mg/m$^2$
  "NAROACTY CL-95" (trade name), manufactured by Sanyo Chemical Industries, Ltd., nonionic, 1% by mass
Distilled water: added in a manner that the total of the composition becomes 1,000 parts by mass.

Comparative Example 4

Substantially similarly to Example 1, a comparative sample-4 was prepared, except that a 5% by mass gelatin aqueous solution ("ROUSSELOT GELATIN" (trade name), manufactured by Nitta Gelatin Inc.) was coated in a dry thickness of 1.0 μm replacing the adhesive layer used in Example 1. The evaluation results are shown in Table 2.

Comparative Example 5

Substantially similarly to Example 1, a comparative sample-5 was prepared, except that a 5% by mass polyvinylalcohol aqueous solution (10,000 of molecular weight, manufactured by KURARAY CO., LTD.) was coated in a dry thickness of 1.0 μm replacing the adhesive layer used in Example 1. The evaluation results are shown in Table 2.

TABLE 1

| | Adhesive layer | | | |
|---|---|---|---|---|
| Sample No. | First component: Urethane resin | Second component: Acrylic resin | Additive | Support |
| Example 1 | Yes | Yes | None | PET |
| Example 2 | Yes | Yes | Ethylene glycol | PET |
| Example 3 | Yes | Yes | Ethylene glycol Hydroxy compound | PET |
| Example 4 | Yes | Yes | Ethylene glycol Phosphorous acid ester compound | PET |
| Example 5 | Yes | Yes | Ethylene glycol Hydroxamic acid compound | PET |
| Example 6 | Yes | Yes | Ethylene glycol Phosphoric acid compound | PET |
| Example 7 | Yes | Yes | Ethylene glycol Phosphoric acid compound Hydroxamic acid compound | PET |

TABLE 1-continued

| | Adhesive layer | | | |
|---|---|---|---|---|
| Sample No. | First component: Urethane resin | Second component: Acrylic resin | Additive | Support |
| Example 8 | Yes | Yes | None | Glass |
| Example 9 | Yes | Yes | Ethylene glycol | Glass |
| Comparative Example 1 | None | None | None | PET |
| Comparative Example 2 | Yes | None | None | PET |
| Comparative Example 3 | None | Yes | None | PET |
| Comparative Example 4 | None (Gelatin) | | None | PET |
| Comparative Example 5 | None (PVA) | | None | PET |

TABLE 2

| | Initial state | | | | | After light irradiation | | After humidity and heat experience | |
|---|---|---|---|---|---|---|---|---|---|
| Sample No. | Surface resistance (Ω/square) | Transmittance (%) | Adhesion | Haze | Film quality | Surface resistance (Ω/square) | Transmittance (%) | Surface resistance (Ω/square) | Transmittance (%) |
| Example 1 | 11,000 | 85 | A | 2% or less | H | 25,500 | 85 | 13,200 | 85 |
| Example 2 | 720 | 85 | A | 2% or less | H | 900 | 85 | 750 | 85 |
| Example 3 | 700 | 85 | A | 2% or less | H | 800 | 85 | 730 | 85 |
| Example 4 | 700 | 85 | A | 2% or less | H | 760 | 85 | 740 | 85 |
| Example 5 | 680 | 85 | A | 2% or less | H | 740 | 85 | 710 | 85 |
| Example 6 | 720 | 85 | A | 2% or less | H | 770 | 85 | 750 | 85 |
| Example 7 | 650 | 85 | A | 2% or less | H | 700 | 85 | 680 | 85 |
| Example 8 | 11,000 | 85 | A | 2% or less | H | 27,000 | 85 | 16,000 | 85 |
| Example 9 | 720 | 85 | A | 2% or less | H | 900 | 85 | 750 | 85 |
| Comparative Example 1 | 11,500 | 83 | E | 2% or less | H | 66,000 | 82 | 15,000 | 82 |
| Comparative Example 2 | 12,000 | 84 | C | 2% or less | H | 50,500 | 79 | 13,600 | 78 |
| Comparative Example 3 | 11,500 | 84 | C | 2% or less | H | 57,000 | 82 | 14,800 | 80 |
| Comparative Example 4 | 12,500 | 83 | D | 3% | H or less | 80,000 | 82 | 20,400 | 78 |
| Comparative Example 5 | 11,000 | 83 | D | 3% | H | 68,000 | 82 | 21,300 | 81 |

As shown by the results in Table 2, the electroconductive materials of Examples 1 to 9 that have at least two resins were excellent in adhesion, exhibiting high transmittance. Even after light irradiation, the transmittance was high and the surface resistance keeps a low value. Thus, an excellent durability against light was exhibited. In addition, after humidity and heat experience, the transmittance was still high and the surface resistance keeps a low value. Thus, an excellent durability against humidity and heat was exhibited.

Example 10

A sample-10 was prepared by coating the following coating liquid A in a dry thickness of 20 nm on the electroconductive layer of the sample-1 prepared in Example 1.

Evaluations carried out similarly to Example 1 showed that the sample-10 was still more excellent in the durability against humidity and heat.

Coating Liquid A

Polyethylene methacrylate copolymer binder: 23.3 parts by mass,
   "NUCREL N410" (trade name), manufactured by DU PONT-MITSUI POLYCHEMICALS CO., LTD.

Colloidal silica: 15.4 parts by mass,
   "SNOWTEX R503" (trade name), manufactured by Nissan Chemical Co., Ltd., solid content: 20% by mass Epoxy monomer: 221.8 parts by mass,
   "DENACOAL EX614B" (trade name: manufactured by Nagase Chemtex Corp., solid content: 22% by mass Surfactant A: 19.5 parts by mass,
   1% by mass aqueous solution of "NAROACTY CL-95" (trade name), manufactured by Sanyo Chemical Industries, Ltd.

Surfactant B: 7.7 parts by mass, and
   1% by mass aqueous solution of "LAPISOL A-90" (trade name), manufactured by Nippon Oil&Fat Co., Ltd.

Distilled water: added in a manner that the total of the composition becomes 1,000 parts by mass.

Example 11

A sample-11 was prepared by coating the following coating liquid B in a dry thickness of 20 nm on the electroconductive layer of the sample-1 prepared in Example 1, and drying it at 100° C. for 5 minutes.

Evaluations carried out similarly to Example 1 showed that the sample-11 was still more excellent in the durability against humidity and heat.

Coating Liquid B

Polyethylene methacrylate copolymer binder: 23.3 parts by mass,
   "NUCREL N410" (trade name), manufactured by DU PONT-MITSUI POLYCHEMICALS CO., LTD.

Colloidal silica: 15.4 parts by mass,
   "SNOWTEX R503" (trade name), manufactured by Nissan Chemical Co., Ltd., solid content: 20% by mass Epoxy monomer: 221.8 parts by mass,
   "DENACOAL EX614B" (trade name: manufactured by Nagase Chemtex Corp., solid content: 22% by mass Surfactant A: 19.5 parts by mass,
   1% by mass aqueous solution of "NAROACTY CL-95" (trade name), manufactured by Sanyo Chemical Industries, Ltd.

Surfactant B: 7.7 parts by mass,
1% by mass aqueous solution of "LAPISOL A-90" (trade name), manufactured by Nippon Oil&Fat Co., Ltd.
Tin oxide doped with antimony oxide: 10.0 parts by mass, and
prepared in accordance with the following composition
Distilled water: added in a manner that the total of the composition becomes 1,000 parts by mass.
Preparation of Dispersion Liquid of Tin Oxide and Antimony Oxide Composite
Stannic chloride hydrate in an amount of 230 parts by mass and antimony trichloride in an amount of 23 parts by mass were dissolved in 3,000 parts by mass of ethanol to obtain a uniform solution. A 1N sodium hydroxide aqueous solution was dropped to the solution until the pH of the solution becomes 3 so as to obtain colloidal coprecipitates of stannic oxide and antimony oxide.

The resulting coprecipitates were left at 50° C. for 24 hours to obtain reddish brown colloidal precipitates, which were then ultracentrifugally separated. Water was added to the precipitates so as to wash them with water and to remove excess ions through ultracentrifugal separation. This procedure was repeated three times to remove excess ions.

Two hundred parts by mass of the colloidal precipitates free of excess ions were dispersed again in 1,500 parts by mass of water and sprayed into a sintering furnace heated at 600° C. to obtain blue-tinged fine particle powders of a tin oxide and antimony oxide composite having an average particle diameter of 0.2 μm. The specific resistivity of these fine particle powders was 25 Ω·cm.

Examples 12 to 14

Samples-12 to 14 were prepared substantially similarly to Example 1, except that the following aqueous dispersion liquids were used respectively in place of "DENTRON P502" (trade name, manufactured by Nagase Chemtex Corp.) that was used in Example 1.

Example 12 an aqueous dispersion liquid ("BAYTRON P" (trade name), manufactured by Stark GmbH) containing poly(3,4-ethylenedioxy)thiophene doped with polystyrene sulfonic acid.

Example 13 an aqueous dispersion liquid ("BAYTRON P-HC V4" (trade name), manufactured by Stark GmbH) containing poly (3,4-ethylenedioxy)thiophene doped with polystyrene sulfonic acid.

Example 14 an aqueous dispersion liquid ("BAYTRON P-AG" (trade name), manufactured by Stark GmbH) containing poly(3,4-ethylenedioxy)thiophene doped with polystyrene sulfonic acid.

The resulting samples-12 to 14 were evaluated similarly to Example 1. As a result, similarly to Example 1, adhesion and durabilities against light, humidity and heat are confirmed to be improved.

Example 15

A sample-15 was prepared substantially similarly to Example 1, except that a dispersion liquid containing polyaniline (manufactured by Aldrich Corp.) in xylene was used in place of "DENTRON P502" (trade name, manufactured by Nagase Chemtex Corp.) that was used in Example 1.

The resulting sample-15 was subjected to evaluations similarly to Example 1. Similarly to Example 1, durabilities against light, humidity and heat were confirmed to be improved.

Example 16

A sample-16 was prepared substantially similarly to Example 1, except that a 200 μm thick "TEONEX Q65F" (trade name, PEN, manufactured by Teijin DuPont Films Japan Limited) was used in place of the PET substrate. The resulting sample-16 was subjected to evaluations similarly to Example 1. Substantially similar effects to Example 1 were obtained.

Example 17

Production of Touch Panel
A film having an adhesive layer and a layer containing poly(3,4-ethylenedioxy)thiophene (PEDOT) doped with polystyrene sulfonic acid (PSS) that were formed on the one face of a PET film was prepared substantially similarly to the procedure of Example 1.

A substrate having indium tin oxide formed on a glass substrate was prepared. After a 4 μm thick dot spacer (resist "CR-103C" (trade name), manufactured by TOYOBO CO., Ltd.) was formed through photolithography, a wiring was formed from a silver paste ("DW-250H-5" (trade name), manufactured by TOYOBO CO., LTD.) through screen printing. Further, insulating portions were formed from an insulating ink ("JELCON IN" (trade name), manufactured by JUJO CHEMICAL CO., LTD.). Finally, the resulting film was laminated onto the substrate to obtain a touch panel device.

Evaluation of Touch Panel Device
The touch panel device was operated under the outdoor condition where sunlight was irradiated on the device. The device was found to exhibit an adequate performance as a touch panel. Namely, the touch panel device that was formed from the electroconductive material of the present invention was confirmed to have a high durability against light. In addition, the device was fount to exhibit an adequate performance as a touch panel in an environment of 60° C. and 95% RH. Namely, the touch panel device that was formed from the electroconductive material of the present invention was confirmed to have a high durability against humidity and heat.

Example 18

A sample 18 was prepared in the same manner as in Example 1, except that the coating liquid E of Example 5 in JP-A 2007-152886, which contains a polyester resin, a polyurethane resin, an anionic surfactant and a nonionic surfactant, was used for forming an adhesive layer. Sample 18 exhibited similar effects to Example 1.

Example 19

A sample 19 was prepared in the same manner as in Example 1, except that a coating liquid without an anionic surfactant was used for forming an adhesive layer. Sample 19 was superior to Comparative Example 4, which used a gelatin aqueous solution for forming an adhesive layer, in terms of improving durabilities against light, humidity and heat; however, sample 19 was inferior to Example 1 in these respects.

The foregoing description of the embodiments of the present invention has been provided for the purposes of illustration and description. It is not intended to be exhaustive or to limit the present invention to the precise forms disclosed. Obviously, many modifications and variations will be apparent to practitioners skilled in the art. The embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An electroconductive material, comprising:
   a support;
   at least one electroconductive layer on or above the support; and
   an adhesive layer containing at least two binder resins between the support and the electroconductive layer, wherein the at least two binder resins comprise a polyurethane resin and an acrylic resin, and a mass ratio of the polyurethane resin to the acrylic resin (polyurethane resin:acrylic resin) is from 95:5 to 50:50.

2. The electroconductive material according to claim 1, wherein the electroconductive layer comprises a π-electron conjugated polymer, silver, or a carbon material.

3. The electroconductive material according to claim 2, wherein the π-electron conjugated polymer is at least one selected from the group consisting of polythiophene, polyaniline, polypyrrole, and derivatives thereof 4. The electroconductive material according to claim 2, wherein the π-electron conjugated polymer includes poly(3,4-ethylenedioxy)thiophene.

5. The electroconductive material according to claim 2, wherein the electroconductive layer containing the π-electron conjugated polymer further comprises polystyrene sulfonic acid as a dopant.

6. The electroconductive material according to claim 1, wherein the support is a flexible support.

7. The electroconductive material according to claim 6, wherein the flexible support comprises polyester resin as a main component.

8. The electroconductive material according to claim 7, wherein the polyester resin includes polyethylene terephthalate.

9. The electroconductive material according to claim 1, wherein the adhesive layer comprises an anionic surfactant.

10. The electroconductive material according to claim 1, wherein the at least two binder resins comprise a polyurethane resin having a glass transition temperature of 30° C. or higher and an acrylic resin having a glass transition temperature of 30° C. or higher.

11. The electroconductive material according to claim 1, wherein the adhesive layer comprises a crosslinking agent.

12. The electroconductive material according to claim 11, wherein the crosslinking agent is a carbodiimide compound.

13. The electroconductive material according to claim 1, wherein the thickness of the adhesive layer is from 30 nm to 200 nm.

14. The electroconductive material according to claim 1, wherein the adhesive layer comprises organic or inorganic fine particles and a sliding agent.

15. The electroconductive material according to claim 1, wherein the adhesive layer is formed by coating an aqueous coating liquid for forming an adhesive layer and drying the coating liquid at a maximum temperature of from 120° C. to 170° C.

16. A method of producing an electroconductive material according to claim 1, the method comprising: biaxially drawing a support made of polyester; forming an adhesive layer by coating an aqueous coating liquid for forming an adhesive layer on at least one face of the support after the drawing; and drying; and forming an electroconductive layer.

* * * * *